United States Patent [19]

Shapiro

[11] 4,444,736

[45] Apr. 24, 1984

[54] PROCESS FOR REMOVING $SO_2$ AND $NO_x$ FROM GASES

[75] Inventor: Edward Shapiro, Pittsburgh, Pa.

[73] Assignee: Pittsburgh Environmental Systems Incorporated, Pittsburgh, Pa.

[21] Appl. No.: 392,546

[22] Filed: Jun. 28, 1982

[51] Int. Cl.³ .................. C01B 21/00; C01B 17/00
[52] U.S. Cl. .......................... 423/235; 423/239; 423/242; 423/244; 423/561 R; 423/561 A; 423/571
[58] Field of Search .......... 423/235, 239, 242 R, 423/242 A, 244 R, 244 A, 551, 561 R, 561 A, 561 B, 571, 633

[56] References Cited

U.S. PATENT DOCUMENTS

| | | | |
|---|---|---|---|
| 1,062,120 | 5/1913 | Sanborn et al. | 423/242 |
| 1,976,704 | 10/1934 | Ward et al. | 423/239 |
| 3,695,828 | 10/1972 | Gertsen et al. | 423/239 |
| 3,784,680 | 1/1974 | Strong et al. | 423/242 |
| 3,920,421 | 11/1975 | Collin | 423/242 |
| 4,008,169 | 2/1977 | McGauley | 423/244 |
| 4,130,628 | 12/1978 | Barnes | 423/235 |

OTHER PUBLICATIONS

Thermal Decomposition of Iron Sulphates II, Huuska et al., J. Appl. Chem. Biotechnol., 1976, 26, 729-734.

*Primary Examiner*—Gregory A. Heller
*Attorney, Agent, or Firm*—Webb, Burden, Robinson & Webb

[57] ABSTRACT

A process for removing $SO_2$ and $NO_x$ from waste gas and recovering sulfur comprising scrubbing the waste gases with a water slurry of FeS in the presence of $FeSO_4$ and $Na_2SO_4$. $SO_2$ is captured by the formation of $FeS_2$ and $FeSO_4$ in the scrubber. By thermal regeneration in a reducing atmosphere the $FeS_2$ is converted to FeS and $Na_2SO_4$ to $Na_2S$. The FeS is recycled to the scrubber. The $Na_2S$ is returned to the system reacting with $FeSO_4$ to form $Na_2SO_4$ and FeS. The last reaction reduces the amount of $FeSO_4$ entering the regenerator where by an undesirable side reaction, it may be partially converted to $SO_2$ and $Fe_3O_4$.

5 Claims, 2 Drawing Figures

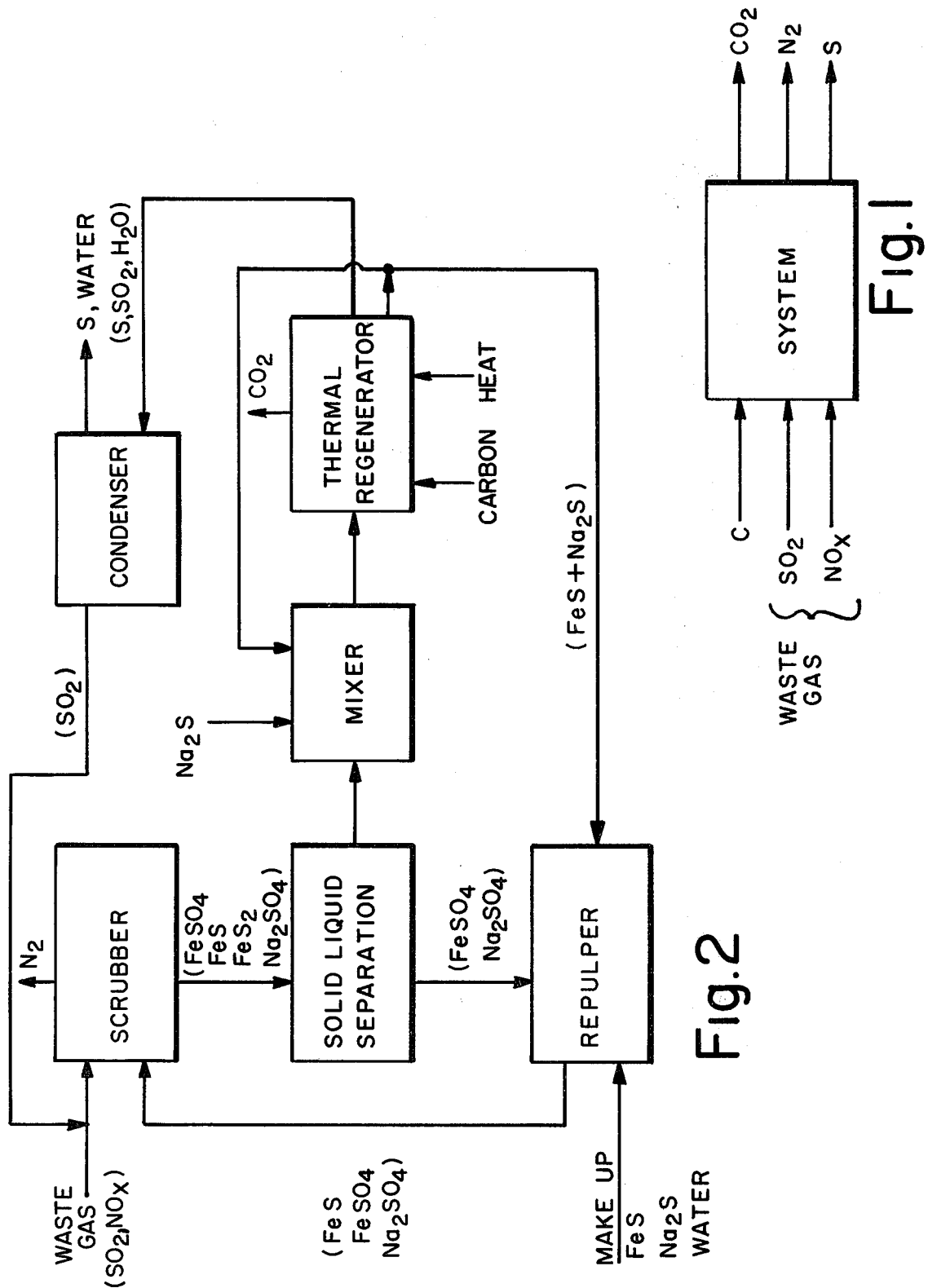

PROCESS FOR REMOVING $SO_2$ AND $NO_x$ FROM GASES

BACKGROUND

This invention relates to an improvement in the known process for removing nitrogen oxides and sulfur dioxide from waste gas by scrubbing with a slurry of ferrous sulfide (FeS). The $SO_2$ is captured according to the following chemical reaction:

$$3FeS + 2SO_2 \rightarrow FeSO_4 + 2FeS_2.$$

The nitrogen oxides are converted to $N_2$ by reactions involving $FeSO_4$ and FeS. The conversion of the nitrogen oxide to $N_2$ increases the $FeSO_4$ production in the scrubber.

The insoluble $FeS_2$ and a portion of the soluble $FeSO_4$ present in a wet filter cake are thermally regenerated in the presence of a reducing agent to produce FeS for reuse in the scrubber. Ideally the sulfur is recovered from the regenerator as elemental sulfur. This process is described in detail in U.S. Pat. No. 4,130,628 entitled "Process for Removing $SO_2$ and $NO_x$ From Gases." This reference is incorporated herein by reference to the extent that it supplements the disclosure of the improved process disclosed herein.

It has now been discovered that the thermal conversion of iron sulfate ($FeSO_4$) to iron sulfide (FeS) does not occur efficiently in the thermal regeneration step. In the regenerator FeS is ideally produced by the following reaction:

$$FeS_2 \rightarrow FeS + S$$

$$FeSO_4 + \text{reductant} \rightarrow FeS + \text{gaseous oxide}.$$

What reactions actually take place in the regeneration are not easily determined as it is not an easily controlled and studied system. Apparently, a side reaction occurs between the $FeSO_4$ and the newly formed FeS that further converts FeS to undesirable iron oxide and sulfur dioxide. See, for example, "Thermal Decomposition of Iron Sulphates II" Huuska et al., J. appl. Chem. Biotechnol. 1976, 26, 729-734. The side reaction may be as follows:

$$FeS + 5FeSO_4 \rightarrow 2Fe_3O_4 + 6SO_2 \uparrow$$

The released $SO_2$ must be recaptured in the scrubber reducing the overall efficiency of the system. The iron oxide must be discarded. Unfortunately, the iron oxide is intermixed with FeS being returned to the scrubber and cannot be separated. Eventually intermixed FeS and $Fe_3O_4$ must be discarded and the process started over with pure FeS.

Better separation of the $FeS_2$ containing slurry from the soluble $FeSO_4$ in the wet filter cake does not help. Washing the filter cake would produce an $FeSO_4$ liquor which would have to be purged from the system causing irretrievable loss of its FeS value.

The loss of recyclable products according to the above-described process is $33\frac{1}{3}$ to 40% depending upon whether $FeSO_4$ is washed from the filter cake or allowed to react with FeS during thermal recovery to form inert $Fe_3O_4$. The loss is even greater if the quantity of nitrogen oxide being scrubbed increases thus producing quantities of $FeSO_4$.

Summary of the Invention

It is an object of this invention to provide a process for removing $SO_2$ and $NO_x$ from gas by scrubbing with FeS which has improved energy efficiency and improved materials efficiency.

Briefly according to this invention, the amount of $FeSO_4$ passed in the wet filter cake to the thermal regenerator is reduced or eliminated by adding $Na_2S$ to the recirculating slurry with the following reaction taking place:

$$FeSO_4 + Na_2S = FeS \downarrow + Na_2SO_4.$$

If the $Na_2S$ is added to the filtrate, very reactive FeS is recycled to the scrubber. The $Na_2SO_4$ thus formed passes harmlessly through the scrubber and a portion of it in the wet filter cake passes to the thermal regenerator where it is converted back to $Na_2S$ without undesirable side reactions. The solid output of the thermal regenerator is thus a mixture of FeS and $Na_2S$. In the case just described where the $Na_2S$ is added to the filtrate, a certain amount of $FeSO_4$ present in the wet filter cake is still passed through the thermal regenerator. $Na_2S$ may be added to the filter cake to convert the $FeSO_4$ to $Na_2SO_4$ to further reduce or eliminate completely the $FeSO_4$ passed to the regenerator. The $Na_2S$ added to the filter cake may be $Na_2S$ added as makeup or the mixture of sulfides from the regenerator.

Summarizing the process according to this invention comprises removing sulfur dioxide and nitrogen oxide from gases comprising a number of steps. The first step includes scrubbing the gases in a scrubber with a water slurry of ferrous sulfide (FeS) in the presence of dissolved $FeSO_4$ and dissolved $Na_2SO_4$ under conditions which capture the $SO_2$ by the following reaction:

$$3FeS + 2SO_2 \rightarrow FeSO_4 + 2FeS_2.$$

Selection of the proper conditions minimizes formation of $Fe_2O_3$ and sulfur in the scrubber. The second step comprises separating the substantially insoluble $FeS_2$ and a portion of the $FeSO_4$ and $Na_2SO_4$ as a wet filter cake from a filtrate including the remainder of the $FeSO_4$ and $Na_2SO_4$. A third step comprises heating the wet filter cake in a reducing atmosphere at temperature between 650° and 900° C. to form FeS, $Na_2S$ and sulfur which is gaseous thereby to separate the sulfur from the solid sulfides. The fourth step comprises mixing the sulfide products from the heating step with the filtrate from the separating step to replenish FeS and such that the $Na_2S$ reacts with $FeSO_4$ to form FeS and $Na_2SO_4$. A fifth step comprises recycling the mixture of the mixing step to the scrubber to scrub additional sulfur dioxide and nitrogen oxides. Thus the quantity of $FeSO_4$ passed in the wet filter cake to the heating step is reduced. Also FeS of greatly increased reactivity is passed to the scrubber. (The precipitated FeS is more reactive than the thermally regenerated FeS.)

According to a preferred embodiment, the sulfide products of the heating step and/or makeup $Na_2S$ are mixed with the wet filter cake such that the $Na_2S$ reacts with the $FeSO_4$ to form FeS and $Na_2SO_4$ thus preventing or reducing the quantity of $FeSO_4$ passed with the wet filter cake to the heating step.

THE DRAWINGS

FIG. 1 is a diagram illustrating the ideal inputs and outputs to a process according to this invention; and FIG. 2 is a schematic diagram showing the flow of materials in a process according to this invention.

DESCRIPTION OF PREFERRED EMBODIMENT

FIG. 1 illustrates that the inputs to the process ideally are $SO_2$ and $NO_x$ in the waste gas and the reductant added to the thermal regenerator. The products of the process are harmless $CO_2$ and $N_2$ exhausted to the atmosphere and elemental sulfur condensed from the gaseous output of the regenerator. Of course, heat energy must be supplied to the regenerator. Since, in a practical process, intermediate reactants are lost, makeup water, makeup FeS, and makeup $Na_2S$ are added to maintain the desired reaction conditions.

Referring now to FIG. 2, after the applicant's process has been in operation it continues to operate scrubbing the waste gases containing $SO_2$ and possibly $NO_x$ with the water slurry of recirculated FeS. The slurry water has dissolved therein recirculated $FeSO_4$ and $Na_2SO_4$ in an amount that will depend upon the particular operating conditions. As explained in the above reference patent, the conditions in the scrubber must be maintained to minimize formation of $Fe_2O_3$ and elemental sulfur in the scrubber. This is achieved by maintaining the molar ratio of FeS to $SO_2$ in the scrubber at least 1.5 to 1 at a temperature of ambient to 100° C. and a pH of at least 5.5.

The spent slurry comprises insoluble $FeS_2$, insoluble FeS that passed through the scrubbing step unreacted and dissolved $Na_2SO_4$ and $FeSO_4$ (the $FeSO_4$ comprises recirculated $FeSO_4$, if any, and that formed in the scrubber). A liquid solid separation step is effected, for example, as described in the reference patent. The filter cake will typically consist of 60% by weight insoluble solids and the remainder retained liquid. The liquid contains dissolved $FeSO_4$ and $Na_2SO_4$. The amount of $FeSO_4$ will depend on two factors. The first factor comprises the extent of the conversion of $FeSO_4$ to $Na_2SO_4$ prior to the scrubber. The second factor comprises the amount of $SO_2$ and $NO_x$ in the flue gases being scrubbed.

The filter cake may be passed directly to the thermal regenerator or it may be mixed with a source of $Na_2S$ to convert any $FeSO_4$ present to FeS and $Na_2SO_4$. The source may either be the product of the regenerator (to be explained) or makeup $Na_2S$.

The filter cake is then passed to the thermal regenerator which is substantially as described in the reference patent. Heat and reducing agent convert the $Na_2SO_4$ to $Na_2S$ and $FeS_2$ to FeS. Sulfur is condensed from the regenerator flue gases as elemental sulfur.

The filtrate from the solid liquid separation is passed to a repulper where it is mixed with FeS and $Na_2S$ from the thermal regenerator. The details may be substantially described in the reference patent. In the repulper the FeS slurry is made up and adjusted. A mixture of FeS and $Na_2S$ from the regenerator is added to the repulper where $Na_2S$ reacts with the $FeSO_4$ to form very reactive FeS and $Na_2SO_4$.

The following advantages result from the introduction of sodium sulfide $Na_2S$ as an intermediate reactant in the process. Sodium sulfate reduces to sodium sulfide without substantial generation of $SO_2$. Iron sulfate and/or iron oxide catalyzes the sodium sulfate reduction. Substantially the same temperatures are required for the reduction of the sodium sulfate as required for the dissociation of the ferrous disulfide ($FeS_2$). Coke can be used directly as an effective reductant.

The ferrous sulfide precipitated in the repulper is very reactive (probably due to its fineness) and increases the effectiveness of the scrubber to capture $SO_2$. Of course, the precipitated ferrous sulfide does not require screening, reducing the size of the needed screening equipment over which the product of the thermal regenerator must be passed. Also, the amount of rejected coarse ferrous sulfide which is an undesirable by-product of the thermal regenerator is reduced.

Having thus described the invention in the detail and particularity required by the Patent Laws, what is desired protected by Letters Patent is set forth in the following claims.

I claim:

1. A process for removing sulfur dioxide from gases comprises the steps for:
   (a) scrubbing said gases in a scrubber with a water slurry of ferrous sulfide in the presence of dissolved $FeSO_4$ and $Na_2SO_4$ under conditions which capture the $SO_2$ by the following reaction:

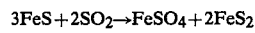
   $$3FeS + 2SO_2 \rightarrow FeSO_4 + 2FeS_2$$

with minimal formation of $Fe_2O_3$ and sulfur;
   (b) separating the substantially insoluble $FeS_2$ and a portion of the dissolved $FeSO_4$ and $Na_2SO_4$ as a wet filter cake from a filtrate including the remainder of the $FeSO_4$ and $Na_2SO_4$;
   (c) heating the wet filter cake in a reducing atmosphere at a temperature between about 650° and 900° C. to form $FeS_2$ and $Na_2S$ and sulfur, which sulfur is gaseous thereby being separated from the solid sulfides;
   (d) mixing the sulfide products of the heating step with the filtrate from the separating step and makeup water such that the $Na_2S$ reacts with $FeSO_4$ to form FeS and $Na_2SO_4$; and
   (e) recycling the mixture of step (d) to the scrubber to scrub additional sulfur dioxide, whereby the quantity of $FeSO_4$ passed in the wet filter cake to the heating step is reduced and FeS of increased reactivity is passed to the scrubber and the iron oxide formed in the reducing step is diminished.

2. A process for removing sulfur dixode and nitrogen oxide from gases comprises the steps for:
   (a) scrubbing said gases in a scrubber with a water slurry of ferrous sulfide in the presence of dissolved $FeSO_4$ and $Na_2SO_4$ under conditions which capture the $SO_2$ by the following reaction:

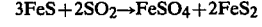
   $$3FeS + 2SO_2 \rightarrow FeSO_4 + 2FeS_2$$

with minimal formation of $Fe_2O_3$ and sulfur and under conditions wherein nitrogen oxides are converted to $N_2$ with a corresponding increase in $FeSO_4$;
   (b) separating the substantially insoluble $FeS_2$ and a portion of the dissolved $FeSO_4$ and $Na_2SO_4$ as a wet filter cake from a filtrate including the remainder of the $FeSO_4$ and $Na_2SO_4$;
   (c) heating the wet filter cake in a reducing atmosphere at a temperature between about 650° and 900° C. to form $FeS_2$ and $Na_2S$ and sulfur, which sulfur is gaseous thereby being separated from the solid sulfides;

(d) mixing the sulfide products of the heating step with the filtrate from the separating step and makeup water such that the $Na_2S$ reacts with $FeSO_4$ to form $FeS$ and $Na_2SO_4$; and (e) recycling the mixture of step (d) to the scrubber to scrub additional sufur dioxide and nitrogen oxide, whereby the quantity of $FeSO_4$ passed in the wet filter cake to the heating step is reduced and $FeS$ of increased reactivity is passed to the scrubber and the iron oxide formed in the reducing step is diminished.

3. The process according to claims 1 or 2 wherein makeup $Na_2S$ is mixed with the wet filter cake and reacts with $FeSO_4$ to form $FeS$ and $Na_2SO_4$, whereby the quantity of $FeSO_4$ passed in the wet filter cake to the heating step is further reduced.

4. The process according to claims 1 or 2 wherein sulfide products of the heating step are mixed with the wet filter cake such that $Na_2S$ reacts with the $FeSO_4$ to form $FeS$ and $Na_2SO_4$, whereby the quantity of $FeSO_4$ passed in the wet filter cake to the heating is further reduced.

5. The process according to claims 1 or 2 wherein makeup water, $FeS$ and $Na_2S$ are added to the filtrate from the separating step.

* * * * *